United States Patent [19]

McLoughlin

[11] Patent Number: 4,478,252

[45] Date of Patent: Oct. 23, 1984

[54] DEVICE FOR ENCLOSING OBJECTS

[75] Inventor: Robert H. McLoughlin, Highworth, Nr. Swindon, England

[73] Assignee: Raychem Ltd., United Kingdom

[21] Appl. No.: 344,269

[22] Filed: Jan. 28, 1982

[30] Foreign Application Priority Data

Feb. 5, 1981 [GB] United Kingdom ............... 8103625

[51] Int. Cl.³ .................. F16L 55/00; H01B 17/00
[52] U.S. Cl. .................................. 138/140; 138/150; 138/151; 174/DIG. 8; 428/36
[58] Field of Search ............ 138/99, 154, 156, 157, 138/150, 151, 103, 110, 140; 174/92, DIG. 8; 229/48 R, 48 SA, 48 SB, 48 SC, 48 T, DIG. 12; 428/36, 192, 99, 913; 24/16 PB; 285/381, 419; 206/497

[56] References Cited

U.S. PATENT DOCUMENTS

| 224,228 | 2/1880 | Ritchie | 138/154 |
|---|---|---|---|
| 3,379,218 | 4/1968 | Conde | 174/DIG. 8 |
| 3,737,559 | 6/1973 | Cooper, Jr. | 174/92 X |
| 4,268,559 | 5/1981 | Smuckler | 428/36 X |
| 4,280,258 | 7/1981 | Kunze | 24/16 PB X |
| 4,388,488 | 6/1983 | Wlcek et al. | 178/DIG. 8 |

FOREIGN PATENT DOCUMENTS

| 1947057 | 3/1970 | Fed. Rep. of Germany | 174/92 |
|---|---|---|---|
| 1488408 | 7/1967 | France | 24/16 PB |
| 975654 | 11/1964 | United Kingdom . | |
| 990235 | 4/1965 | United Kingdom . | |
| 1010064 | 11/1965 | United Kingdom . | |
| 1155470 | 6/1969 | United Kingdom . | |
| 1162376 | 8/1969 | United Kingdom . | |
| 2043729A | 10/1969 | United Kingdom . | |
| 1225463 | 3/1971 | United Kingdom . | |
| 1284082 | 8/1972 | United Kingdom . | |
| 1294665 | 11/1972 | United Kingdom . | |
| 1506242 | 4/1978 | United Kingdom . | |
| 1535696 | 12/1978 | United Kingdom . | |
| 2018527A | 10/1979 | United Kingdom . | |
| 2019123 | 10/1979 | United Kingdom . | |
| 2023021A | 12/1979 | United Kingdom . | |
| 1561125 | 2/1980 | United Kingdom . | |
| 2044561A | 10/1980 | United Kingdom . | |

Primary Examiner—Stephen Marcus
Assistant Examiner—Mark Thronson
Attorney, Agent, or Firm—Herbert G. Burkard; T. Gene Dillahunty; Dennis E. Kovach

[57] ABSTRACT

A device for enclosing elongate objects comprises a dimensionally-recoverable cover which can be wrapped-around the object and closed by means of closure elements located on the cover. The closure elements are preferably in the form of a row of protuberances spaced apart along the edge portions of the cover the protuberances of one edge portion being nestable within the protuberances of the other edge portion. The protuberances are preferably provided with retaining elements which lock the nested protuberances together and will accommodate relative movement between adjacent pairs of nested protuberances to allow the device to be recovered onto objects of varying dimensions.

24 Claims, 19 Drawing Figures

DEVICE FOR ENCLOSING OBJECTS

BACKGROUND OF THE INVENTION

This invention relates to devices for enclosing elongate objects for example pipes or cables and in particular to dimensionally-recoverable devices for enclosing such objects.

Dimensionally-recoverable wrap-around devices have become widely employed for sealing, insulating or otherwise protecting a substrate where the use of a preformed tubular cover, such as a sleeve, is not possible or convenient, for example where the end of an elongate substrate is not accessible. In general, a wrap-around device comprises a cover which is adapted to be wrapped around the substrate to be enclosed, and a closure arrangement for securing the cover in tubular form about the substrate. After being secured about the substrate, the cover may be recovered onto the substrate by the application of heat or by another appropriate method. Examples of wrap-around devices are described in U.S. Pat. Nos. 3,379,218, 3,455,336, 3,530,898, 3,542,077, U.K. Patent Specification No. 1,561,125 and in German Offenlegungsschrift No. 1,947,057, the disclosures of which are incorporated herein by reference.

Whilst the above wrap-around devices are suitable for enclosing straight substrates of generally uniform dimensions, no previously proposed device is entirely satisfactory for sealing a substrate against ingress of fluids, where the shape or dimensions of the substrate vary abruptly, for example where a tubular substrate has a sharp bend or branch e.g. in the form of a "T", or where the substrate is in the form of a "transition", i.e. where the diameter of the substrate increases or decreases abruptly along its length. It has been found that the closure arrangements of such substrates either are not susceptible to being located about abrupt changes in the surface of the substrate or, if they are, cannot form a reliable seal against ingress of fluids.

SUMMARY OF THE INVENTION

The present invention provides a device for enclosing at least part of an elongate object, which comprises a dimensionally-recoverable cover adapted to be positioned about the object and recovered thereon, the cover having corresponding closure portions preferably extending along or adjacent to the edges of the cover which are non-perforate and which can be retained together in a lap configuration by means of a mechanical closure arrangement which comprises a plurality of closure elements spaced apart along each closure portion, the closure elements of each closure portion being interlockable with the closure elements of the corresponding closure portion so that the closure portions can be retained together and adjacent pairs of engaged closure elements can move with respect to each other.

Preferably the adjacent pairs of engaged closure elements can move with respect to each other, if necessary, during recovery of the cover by changing their separation and/or their relative orientation.

The phase "lap configuration" as used herein includes any configuration in which one edge portion overlies another edge portion. Thus the phrase includes levelled lap, joggle lap, half lap and double lap joint configurations as described in the Adhesives Handbook (Skeist). In addition the phrase includes so called scarf joint configurations which are formed if the edge portions are tapered so that their thickness decreases in a direction toward their edges.

As stated above, the cover of the device is dimensionally-recoverable. Dimensionally-recoverable articles are articles, the dimensional configuration of which may be made substantially to change by the appropriate treatment. Thus, for example, the cover may comprise an elastomeric material which is bonded to a layer of material that holds the elastomeric material in an extended configuration, and which will contract when the bond is broken. Examples of such articles are disclosed in U.S. Pat. No. 4,070,746 and U.K. Specification No. 2,018,527A, the disclosures of which are incorporated herein by reference. Preferably the cover is dimensionally heat-recoverable. Heat-recoverable articles may, for example, be produced by deforming a dimensionally heat-stable configuration to a dimensionally heat-unstable configuration, in which case the article will assume, or tend to assume, the original heat-stable configuration on the application of heat alone.

According to one method of producing a heat-recoverable article, a polymeric material is first extruded or moulded into a desired shape. The polymeric material is then cross-linked or given the properties of a cross-linked material by means of chemical cross-linking initiators or by exposure to high energy radiation, for example a high energy electron beam or gamma radiation. The cross-linked polymeric material is heated and deformed and then locked in the deformed condition by quenching or other suitable cooling methods. The deformed material will retain its shape almost indefinitely until exposed to a temperature above its crystalline melting temperature, for example about 115° C. in the case of polyethylene. Examples of heat-recoverable articles may be found in U.S. Pat. No. 2,027,962 and UK Patent Specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, whilst hot, to a dimensionally heat unstable form.

Any polymeric material to which the property of dimensional recoverability may be imparted, may be used to form the cover. Preferably the cover comprises a polymeric material to which the property of dimensional recoverability has been imparted by crosslinking and deforming the material. Polymers which may be used to form the polymeric material include polyolefins such as polyethylene and ethylene copolymers for example with propylene, butene, vinyl acetate or ethyl acrylate, polyamides, polyurethanes, polyvinyl chloride, polyvinylidene flouride, elastomeric materials such as those described in UK Specification No. 1,010,064 and blends such as those disclosed in UK Specification Nos. 1,284,082 and 1,294,665, the disclosures of which are incorporated herein by reference. Preferably the cover is formed from a polyolefin or a blend of polyolefins, and especially it comprises polyethylene.

The closure arrangement preferably includes means for retaining the closure elements in engagement during recovery of the cover, which means will accommodate relative movement between adjacent pairs of engaged closure elements. The retaining means is arranged to retain the closure elements in engagement against any forces tending to separate them which may be caused by recovery of the cover. Thus, the retaining means should resist not only any shear forces on the edge portions which are arranged in the form of a lap joint, but also forces tending to lift the over-lying edge portion off the underlying edge portion. These latter forces are particularly pronounced in parts of the wrap-around device that are located in the crotch region or regions of 'T's' and bends in the substrate or any other region of the substrate in which surfaces of the substrate meet at a dihedral angle (which may be acute, obtuse or, more usually, substantially a right-angle), and may be due to a number of reasons. These forces occur even if the region of the surfaces where they meet is rounded (as with a welded joint) so that there is no geometrically defined line of intersection, and the term "dihedral angle" is intended to include this arrangement. The forces may be caused by the fact that it is often not possible to cause all parts of the cover to recover simultaneously. Thus, for example, where the wrap-around device is arranged to enclose a "T", each leg of the wrap-around device being recoverable in a radial direction, recovery of any one leg will correspond to recovery in an axial direction with respect to a leg perpendicular thereto.

If one leg is recovered on to the substrate initially, subsequent recovery of a leg perpendicular to it will cause axial tension along the edge portions of the cover, tending to lift the overlying edge portion away from the underlying one in the crotch region. In addition, due to the relatively low thermal conductivity of the materials from which dimensionally-recoverable articles are formed, the overlying edge portion and parts of the cover adjacent to it may attempt to recover before the underlying edge portion and other parts of the cover can accommodate the recovery. Where this happens, the overlying edge portion and adjacent parts of the cover may attempt to contract in an axial direction and so lift the overlying edge portion from the underlying one.

As stated above the retaining means can accommodate relative movement between adjacent pairs of engaged closure elements on recovery of the cover. This is desirable in order to ensure that different parts of the cover in the region of the closure arrangement will recover satisfactorily onto the substrate and so prevent the formation of a path under the cover which may allow passage of fluid along the cover. If the retaining means does not allow the position or orientation of the closure elements, and especially their orientation, to change, it has been found that one part of the wrap-around device, e.g. one leg of a "T" configuration, may be recovered satisfactorily about the substrate, but that when another part of the wrap-around device is recovered, either it is prevented from recovering fully onto the substrate by the closure arrangement, or movement of the closure arrangement due to recovery of the other part of the wrap-around device causes the recovered part of the device to lift off the substrate to a small extent.

The closure elements may be formed in a number of configurations provided that the parts of the edge portions lying between the closure elements are sufficiently flexible to allow the position and/or orientation of the closure elements to change when the cover is recovered. For example the closure elements may be in the form of a row of protuberances extending along each edge portion each of which can be brought into abutment with a corresponding protuberance of the opposed edge portion and retained in abutment by the retaining means. The device not only has the advantage that it can be recovered satisfactorily onto a substrate of non-uniform profile but also that, since installation of the device does not require sliding a channel over the closure elements as with conventional devices, installation can be considerably facilitated, especially in confined spaces. Preferably, however the closure arrangement comprises a row of protuberances that extends along one closure portion and a row of corresponding protuberances that extends along the other closure portion, the protuberances being arranged so that a protuberance on one closure portion can be nested within a protuberance in the other closure portion. These forms of closure arrangement have the advantage that they do not require the provision of any holes in the cover. It has been found that, if the closure mechanism employs a row of apertures in the edge portion to receive closure elements of the other edge portion, there is the danger that the apertures will become elongated due to the recovery forces of the cover since the modulus of the polymeric material forming the edge portions is considerably reduced at the recovery temperature. Any elongation of the apertures would allow the closure elements of the underlying edge portion to disengage themselves from the apertures of the overlying edge portion. A further advantage of the closure arrangements used in the device according to the invention is that the wrap-around devices may be formed from polymeric sheet, as described below, rather than by more expensive moulding processes.

Any of a number of forms of retaining means may be used with the device according to the invention, the particular form depending on the type of closure elements used in the closure arrangement. A number of individual retaining elements may be used, one for each pair of closure elements, or the retaining elements may be connected together for example in the form of a bandolier in which the retaining elements are supported on a carrier strip. The wrap-around device may be sold with the retaining elements in place or they may be provided separately and placed on the closure elements during installation of the wrap-around device. Where, however, the retaining elements are provided on a carrier strip which is intended to remain in place during recovery of the cover, it is desirable for the carrier strip to be sufficiently deformable to allow the position and/or orientation of the closure elements to change as the cover recovers onto the substrate. The retaining elements will usually be in the form of clips, caps, annular or split rings or the like, and are preferably either resiliently deformable to such an extent that they may be placed on one closure element before engagement with the other closure element, and by their deformation, allow the elements to be engaged, for example by a snap-fit action or are formed in such a manner that they can be twisted or crimped to grip the pair of engaged closure elements.

In the preferred form of device, each closure portion has a row of hollow protuberances extending along it, the protuberances of the underlying edge portion being nestable within those of the overlying edge portion, the protuberances of the underlying edge portion containing an internal hold-out member to retain the shape of the protuberance during recovery of the cover. The hold-out member will preferably also co-operate with the retaining elements to retain the protuberances together. In this form of device the internal hold-out member and the recess in the retaining element preferably have corresponding non-circular profiles when viewed from above so that the retaining means can accommodate the pair of engaged protuberances and can be twisted to a position in which the retaining element and internal hold-out member cooperate to lock the protuberances in engagement. The use of a cap has the advantage that it shields the protuberances from the flame of the torch and so prevents the possibility of them being scorched. In addition, the retaining elements used in the device according to the invention are capable of being formed from plastics materials such as thermosetting plastics, e.g., phenol-formaldehyde resins, and so it is possible to construct a wrap-around closure arrangement which uses no metal parts and further reduces the possibility of thermal damage to the heat-shrinkable polymeric material.

It is advantageous if at least one set of protuberances, and preferably all the protuberances, are dimensionally heat-recoverable in such a manner that, when the device is heated, they will become engaged more firmly. For example they may be formed so that, on recovery, their height decreases and their wall-thickness increases thereby causing the retaining elements to grip them more securely.

The wrap-around device according to the invention has the advantage over previously proposed wrap-around devices for enclosing "T's" and bends such as that described in German Offenlegungsschrift No. 1,947,057 in that it can be formed from polymeric sheet material that is dimensionally-recoverable or is capable of being rendered dimensionally-recoverable when deformed in an appropriate manner, for example by pressure or vacuum forming techniques. Thus, for example, a sheet of polymeric material which has been cross-linked and which has preferably also been expanded to render it heat-shrinkable, may simply be deformed, preferably vacuum formed, hot or cold, into the appropriate shape (for example a cruciform shape if it is to be used to enclose a "T") and the rows of protuberances or other closure elements may be formed along each closure edge portion during the same vacuum forming process. The edges of the wrap-around device may then be trimmed and, if desired, the retaining means and/or hold-out elements be provided on the closure elements. The device described in Offenlegungsschrift No. 1,947,057 has the further disadvantage that the closure mechanism is relatively inflexible and so suffers from defects described above.

In order to provide a completely fluid tight seal, it will often be desirable to provide at least the overlying edge portion with a coat of adhesive, preferably a hot-melt adhesive. Examples of hot-melt adhesives that may be used, include those based on polyamides, vinyl and acrylic homo- and copolymers, such as ethylene-vinyl acetate and ethylene-ethyl acrylate copolymers, polyesters and polyolefins.

In many cases it may be desirable to provide the surface of the cover that is intended to contact the object with a layer of sealant in order to fill voids between the cover and object and to provide a seal against contaminants such as moisture, dust, solvents and other fluids. The sealant may for example be an adhesive (preferably a hot-melt adhesive) or a "mastic", the term mastic as used herein including, amongst others, viscid, water-resistant macromolecular compositions which exhibit both viscous and elastic response to stress. Examples of suitable mastics are given in U.K. Patent Specification No. 2,023,021A, the disclosure of which is incorporated herein by reference. It will be appreciated from that specification that the sealant, whether it is a mastic or hot melt adhesive, preferably contains a corrosion inhibitor, and especially a water-soluble passivating corrosion inhibitor.

In most cases the devices will be in the form of a wrap-around article as described above, either an unbranched article for enclosing straight or bent objects, or a branched article, e.g. an article having a cruciform shape for enclosuring a "T" shaped object. It is also possible, however, for the cover to be adapted to be wrapped helically round the elongate object and the closure portions to extend along the length of the cover to retain adjacent windings of the cover together.

Accordingly to another aspect, the invention provides a dimensionally-recoverable device for enclosing at least part of an elongate object, the device having closure portions that can be retained together by means of a closure arrangement which comprises a closure element located on each closure portion, the closure element on each closure portion being engageable with the closure element on the other closure portion, and a retaining element for retaining the closure elements in engagement, the closure elements and retaining element being arranged so that the retaining element can be twisted about the closure elements to lock the closure elements together.

The device according to the invention may be produced by forming a cover from a polymeric material, the cover having non perforate closure portions, expanding the cover to render it dimensionally-recoverable, and forming a plurality of closure elements in each closure portion, the closure elements in each closure portions being engageable with the closure elements in the other closure portion.

The cover may be rendered heat-recoverable either by cross-linking the polymeric material from which it is formed and then expanding it or by forming the cover from polymeric material which has been stretched at a temperature below the crystalline melting point or softening point of the material and has been cross-linked after expansion. If the closure elements are formed by deformation of the cover, e.g. by a vacuum forming process, the cover itself may, if desired, be expanded or be further expanded in the same step.

DETAILED DESCRIPTION OF THE INVENTION

Figure 1:
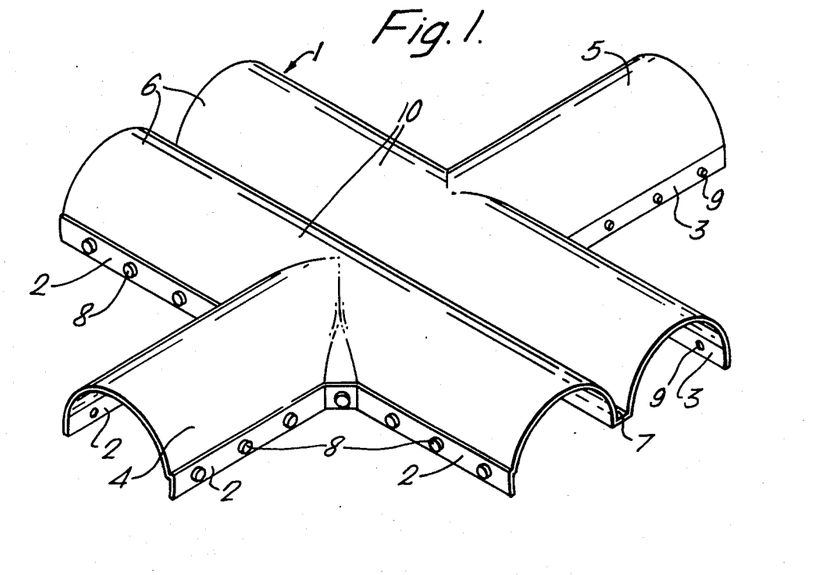
FIG. 1 is a perspective view of a wrap-around device according to the invention before retaining elements have been placed thereon.

Referring to the accompanying drawings, FIG. 1 shows a wrap-around device according to the invention that is suitable for enclosing a "T" section of a pipe. The device comprises a cover 1 formed in a cruciform shape having a main body 6 and two arms 4 and 5. One side of the main body 6 and one arm 4 has an edge portion 2 and the other side of the main body 6, with the other arm 5 has a corresponding edge portion 3. The body 6 has a flexible central portion 7 that allows the body and arms 4 and 5 to be folded around a substrate until the edge portions 2 and 3 are in overlying relationship. The edge portion has a row of hollow protuberances 8 and the edge portion 3 has a row of corresponding protuberances 9 which are of slightly smaller dimensions than the protuberances 8 and which, when the body 6 has been folded about its central portion 7 so that the edge portion 2 overlies the edge portion 3, can be nested within the hollow protuberances 8.

The main body 6 and the arms 4 and 5 of the cover 1 are heat-shrinkable in their radial direction, i.e. each part of the cover apart from the crux regions 10 is uniaxially shrinkable in a direction perpendicular to its edge region 2 or 3, and the crux regions are biaxially shrinkable. The wrap-around device may be formed by deforming a sheet of cross-linked polymeric material that may be, unexpanded or uni- or biaxially expanded, into the desired shape, the deformation preferably being performed by a vacuum forming process in which the protuberances 8 and 9 are formed at the same time.

Preferably the under surface of the cover is coated with a sealant, for example a mastic or a hot-melt adhesive. Preferably also, either the under surface of the edge portion 2 or the outer surface of each portion 3 is coated with a hot-melt adhesive in order to provide a seal between the edges of the installed device. The edge portions may, if desired, be provided with a flap (not shown) that extends beyond the edge of the edge portion 3 and which, after installation of the device, lies under the part of the cover that is adjacent to the edge potion 2. The flap is preferably coated on its outer surface with a hot-melt adhesive in order to increase the path length for fluid ingress between the edge portions.

Figure 2:
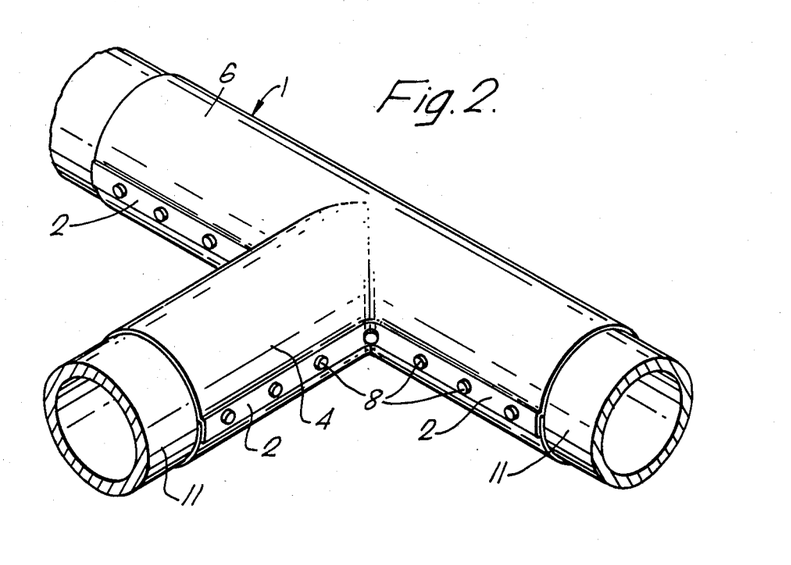
FIG. 2 is a perspective view of the wrap-around device of FIG. 1 when installed.

The device as shown in FIG. 1 may be positioned about a "T" section of a pipe by folding it about the flexible central portion 7 and engaging the protuberances 8 and 9 being retained together by retaining elements that are provided on the protuberances 8 or are provided separately. The device may then be recovered on to the pipe by heating it for example by means of a gas torch or hot-air gun. FIG. 2 is a perspective view of the device shown in FIG. 1 when installed on a substrate 11 (the retaining elements not being shown for the sake of clarity).

FIGS. 3 to 7, are schematic axial sections taken through the crotch region of a substrate and the edge portions of a wrap-around device at various stages during installation. The substrate 12 has a right angle bend and may, for example, be part of a "T" section as shown in FIG. 2. The wrap-around device comprises a cover having arms 13 and 14 that are heat-shrinkable in a radial direction, and edge portions 15 that are retained together by closure elements 16a, 16b, 16c and retaining elements (not shown).

Figures 3, 4:
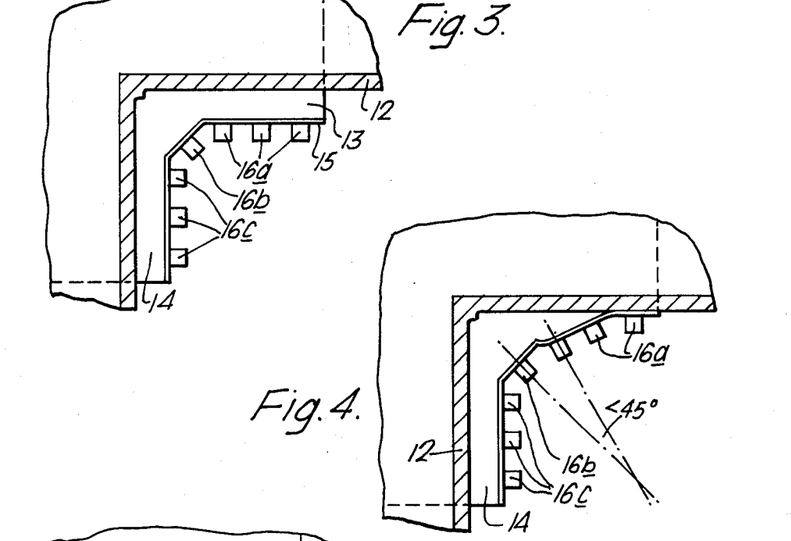
FIGS. 3 to 7 are schematic representations of part of a device according to the invention during installation on a substrate.
Figure 5:
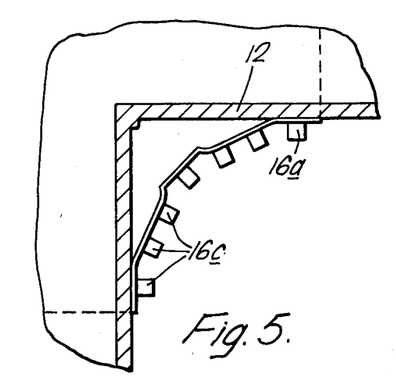
Figure 6:
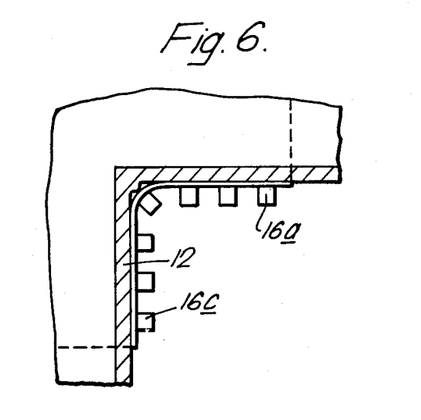
Figures 7, 8:
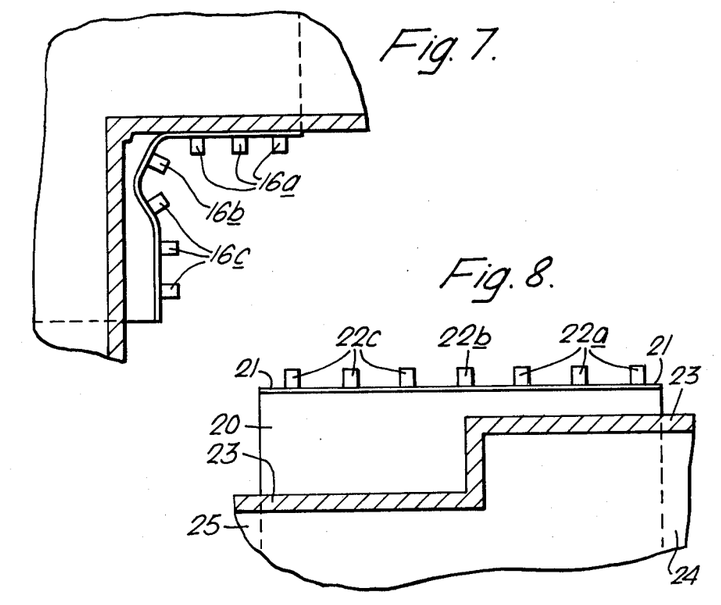
FIGS. 8 and 9 are schematic representations of a further form of device during installation on a substrate.

FIG. 3 shows part of the wrap-around device after it has been positioned about the substrate and the edge portions joined together but before it has been recovered. Closure elements 16a are oriented with their axes parallel, as are closure elements 16c (but with their axes perpendicular to the axes of closure elements 16a), and closure element 16b is oriented with its axis at 45° to the axes of closure elements 16a and 16c. In order to continue installation of the device, arm 13 of the cover is heated until it has recovered radially onto the substrate. As can be seen from FIG. 4, when part of the arm 13 has been recovered, its closure elements 16a are no longer oriented parallel to each other, and the part of the edge portion between closure element 16b and its adjacent closure element 16a has opened out so that the angle between those closure elements is significantly less than 45°. If the arm 13 is heated further so that the part of the arm 13 supporting the closure element 16a adjacent to element 16b recovers onto the substrate, the relative orientation of elements will change so that the angle between their axes increases to a value of 45°, as shown in FIG. 7. Arm 14 of the device is then heated so that it recovers onto the substrate as shown in FIG. 5. At this stage the orientation of the elements 16c has changed in the same way as elements 16a so that the angle between closure element 16b and both its adjacent elements 16a and 16c is significantly reduced. Installation of the device is completed by heating the crux regions of the device so that it recovers onto the substrate as shown in FIG. 6.

Figure 9:
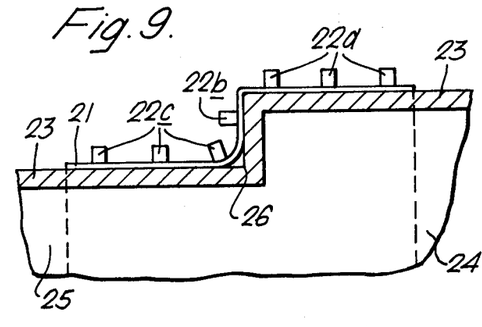

FIG. 8 shows schematically part of a wrap-around device comprising a radially heat-shrinkable cover 20 that is in the form of a split sleeve and has edge portions 21 that have been joined together to close the sleeve by means of closure elements 22a, 22b and 22c and retaining elements (not shown). The wrap-around device is positioned over a tubular substrate 23 in the form of a transition from a part 24 that is of larger diameter to a part 25 that is of smaller diameter. When the device is recovered onto the substrate, the orientation of the closure elements will change as shown in FIG. 9, so that the closure elements will change as shown in FIG. 9, so that the axis of the element 22b diverges from those of elements 22a by about 90° and converges to those of elements 22c. Whilst it is not usually possible for the device to recover fully on to any inwardly directed corner 26 of the substrate, the greater the flexibility of the edge portions (at least at the recovery temperature) and the less the resistance to the change of orientation of the closure elements, the less the distance will be separating the substrate and the edge portions at the corner 26.

Figure 10:
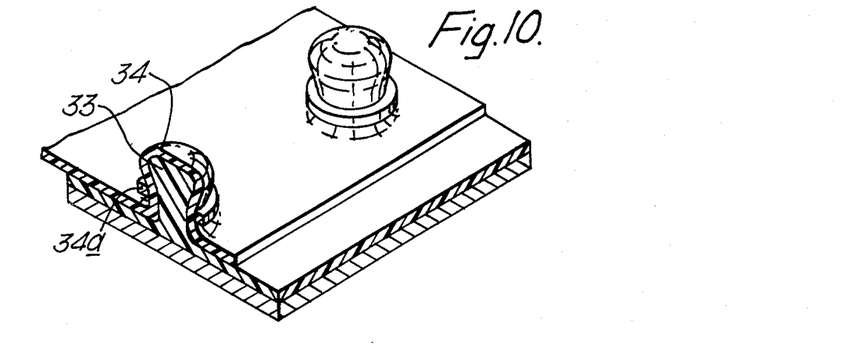
FIGS. 10 and 11 are sections through various different forms of closure elements and associated retaining elements of a wrap-around device.

FIG. 10 is a section through another pair of closure elements in which the closure element of the underlying edge portion 33 is in the form of a solid protuberance and the corresponding closure element 34 of the overlying edge portion is in the form of a hollow protuberance that can be positioned over the element 33 and retained thereon by a ring or resilient clip 34a.

Figure 11:
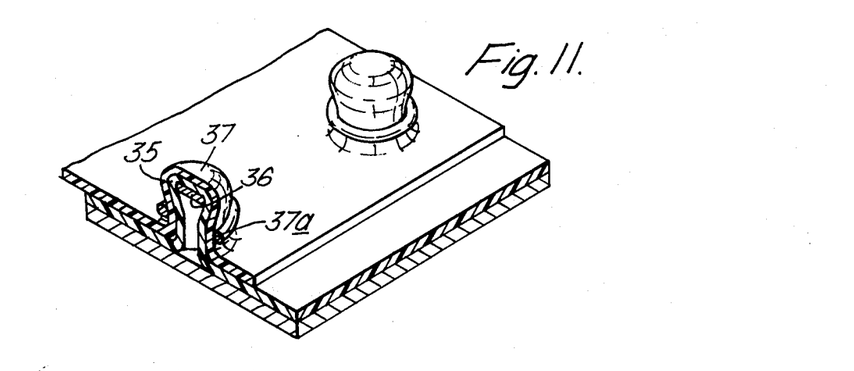

Another pair of closure elements is shown in FIG. 11 in which the closure element 35 of the underlying edge portion is in the form of a hollow protuberance and has a rigid hold-out element 36 retained therein. A corresponding closure element 37 can be fitted over the element 35 and retained on it by a clip 37a. When the pair of closure elements is heated during recovery of the cover, both closure elements will attempt to recover with the result that their wall thickness in the region of the clip 37a will increase and the elements will be locked in position.

Figure 12:
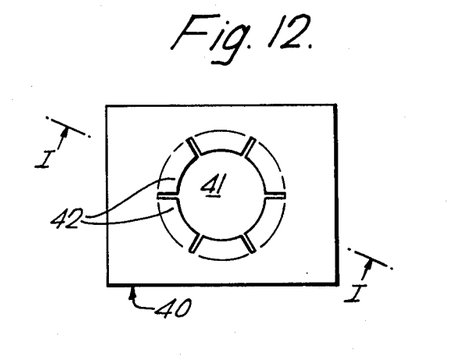
FIG. 12 is a plan view of one form of retaining element.
Figure 13:
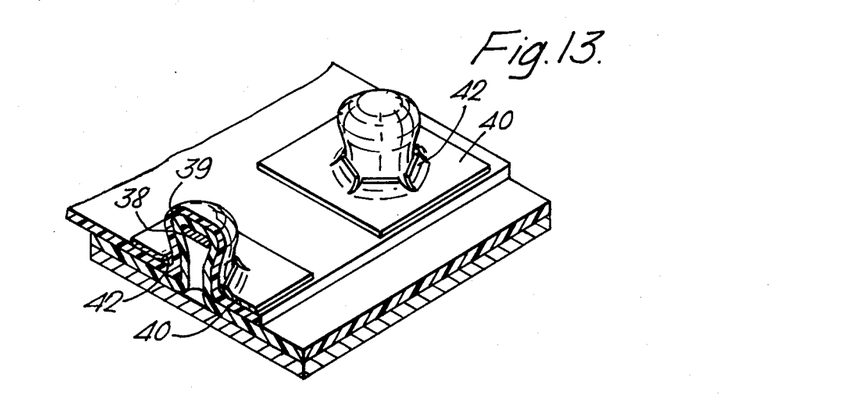
FIG. 13 is a section through another pair of closure elements showing a section of the retaining element of FIG. 12 taken along line I—I.

FIGS. 12 and 13 show a further form of retaining elements. The closure elements 38 and 39 are similar to those of FIG. 11, and the retaining element 40 is in the form of a planar member having an aperture 41 therein, the aperture being bounded by a number of leaf springs 42 directed into the aperture. The leaf springs 42 are bent away from the plane of the retaining element so that the element 40 may be forced over the outer closure element 38 either before or after the closure element 39 has been placed therein. The direction of the leaf springs is such that, when the closure elements and the retaining element have been placed in position, the closure elements cannot be pulled apart.

Figure 14:
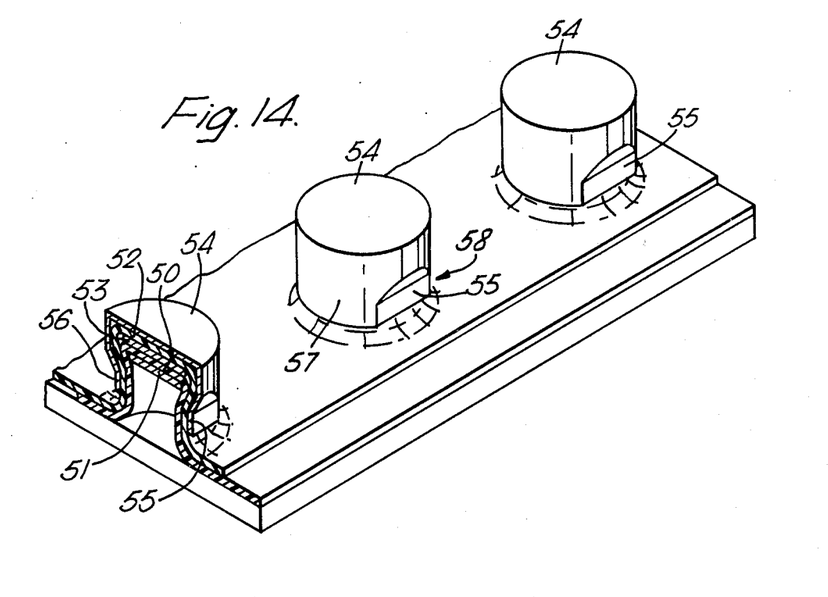
FIG. 14 is a section through another pair of closure elements.

FIG. 14 shows yet another form of the closure elements after they have been engaged. The closure element of the underlying edge portion is in the form of a protuberance 50 and has a rigid hold-out member 51 retained therein. The corresponding closure element of the other edge portion is also in the form of a hollow protuberance 52 and contains a further rigid element 53 that is disc shaped. The protuberance 52 is provided with a metal cap 54 that has been positioned over the protuberance 52 and crimped so that two opposite sides 55 and 56 of the cap are deformed toward each other to form a neck that prevents the cap from being removed from the protuberance, while two other opposite sides 57 and 58 remain undeformed. The rigid hold-out member 51 of the protuberance 50 has a slightly elongate shape as seen in plan view with a minimum diameter that is smaller than the dimensions of the neck in the cap 54 and a maximum diameter that is larger than the dimensions of the neck. If the cap is twisted about the protuberance 52 so that the neck of the cap coincides with the minimum diameter of the member 51 and the undeformed sides 57 and 58 coincide with the maximum diameter of the hold-out member 51, the protuberance 50 can be inserted into the protuberance 52. The cap may then be twisted through an angle of 90° so that the neck coincides with the maximum diameter of the hold-out member 51, thereby locking the two protuberances together. When all the protuberances are locked together in this way, the wrap-around device may be recovered. Advantageously the cap contains means providing a clear visual indication that it has been twisted to an orientation in which the protuberances are locked. The neck need not necessarily be formed by crimping. It may, for example be formed by inserting an appropriately shaped spring within the cap. The maximum diameter of the rigid hold-out element 51 is preferably greater than the separation between walls 55 and 56 of the cap, and is especially from 1.3 to 1.6 times the wall separation.

The use of this arrangement not only has the advantage that the protuberance 52 is shielded from the flame of the gas torch used to recover the device, but also that the installed device may subsequently be removed by opening the engaged edge portions.

It is possible for the rigid element 53 also to be elongate so that the cap 54 may be entirely removed. It is also possible for the hold-out member 51 to be disc shaped and for the cap 54 to be crimped only when the protuberance 50 is nested within protuberance 52. In this case, the rigid element 53 could be dispensed with, although it is preferable for the element 53 to be present because the element 53 ensures that the hold-out member 51 does not slip out of its correct position and that the cap 54 is crimped below the hold-out member 51.

Figure 15:
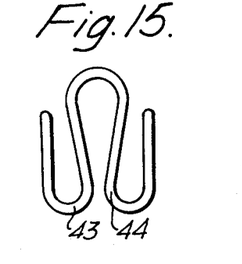
FIGS. 15 to 18 show further forms of retaining elements.
Figure 16:
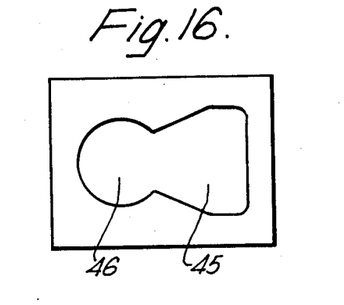
Figure 17:
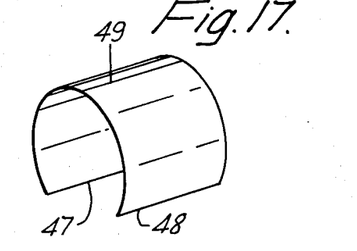

FIGS. 15 and 17 show various forms of retaining elements that are suitable for retaining the closure elements together. FIG. 15 shows a clip formed from a wire that is bent into a serpentine shape and which is especially suitable for use with the closure elements shown in FIG. 11. The clip is preferably made from a metal and is resiliently deformable so that its jaws 43 and 44 can be opened to allow it to be positioned about the elements. The closure element shown in FIG. 16 is in the form of a planar element having a "keyhole" shaped aperture. The element may be placed about a hollow "female" protuberance that is elongate. The aperture has one region 45 of slightly larger dimensions than those of other region 46 so that a "male" protuberance can be inserted into the part of the female protuberance located in the region 45 of the aperture, and then moved within the female protuberance to that part of it that is located in the region 46 of the aperture. Because the region 46 of the aperture is of smaller dimensions than the region 45, the male protuberance cannot be removed from the female protuberance except by being moved back again to region 45 of the aperture. When the protuberances are heated, the part of the female protuberance in the region 45 of the aperture will recover down and the male protuberance will be held within the female protuberance.

FIG. 17 shows another form of retaining element which is in the form of a short section of a split tube. The element may simply be placed over the closure elements so that edges 47 and 48 grip the elements and its apex 49 shields the closure elements from the heating tool, e.g. a gas torch.

Figure 18:
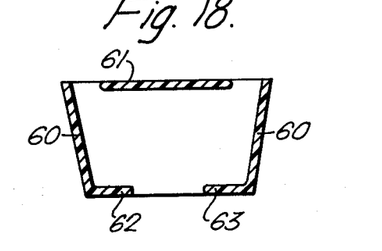

FIG. 18 is a section through another form of cap which may be used with the closure arrangement shown in FIG. 14. The cap has a slightly tapering circular side wall 60, a top portion 61, and ridges 62 and 63 which extend along opposite sides of the wall 60. The inwardly facing edges of the ridges 62 and 63 are separated by a constant distance so that the ridges 62 and 63 together define an elongate recess corresponding to the recess defined by cap walls 55, 56, 57 and 58 in FIG. 14.

Figure 19:
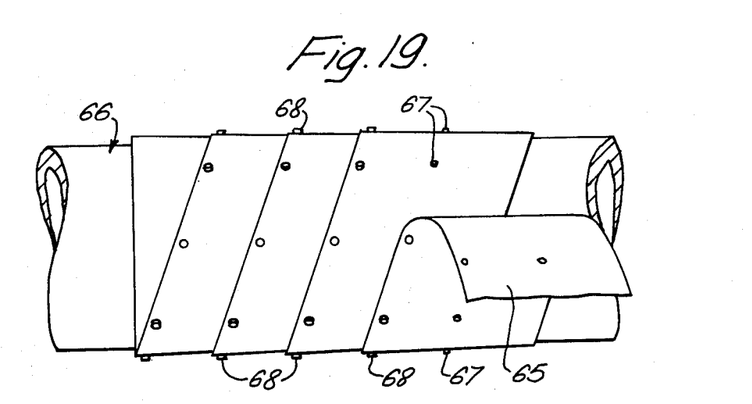
FIG. 19 shows yet another form of device according to the invention.

FIG. 19 shows another form of device comprising an elongate cover 65 which is adapted to be wrapped around a substrate 66 so that adjacent windings of the cover overlap. The cover is provided with a plurality of protuberances 67 extending along one edge portion and a plurality of protuberances 68 extending along or adjacent to the other edge, the protuberances 68 being nestable within the protuberances 67 to retain adjacent windings of the cover together. The protuberances 67 and 68 are shown schematically in the drawing and may have any of the forms described above but are preferably as described in FIG. 14. Retaining elements (not shown) may be positioned over the protuberances 67 either before or after the protuberances have been engaged.

I claim:

1. A device for enclosing at least part of an elongate object, comprising:
   a dimensionally-recoverable cover adapted to be positioned about the object and recovered thereon;
   the cover having corresponding retainable closure portions which are non-perforate;
   a mechanical closure arrangement for retaining the closure portions together in lap configuration, comprising:

a plurality of discrete closure elements spaced apart along each closure portion;

the closure elements of each closure portion being interlockable with the closure elements of the corresponding closure portion for retaining the closure portions together during recovery;

corresponding adjacent pairs of interlocked closure elements being movable with respect to each other; and a plurality of distinct locking retainer elements each of which locks a pair of the interlocked closure elements, said retainer elements being constructed such that said retainer elements are sufficiently deformable relative to one another to allow a position and an orientation of said adjacent pairs of interlocked closure elements to change as said cover is recovered to accomodate recovery of the device onto objects of varying dimensions;

whereby, upon recovery of the device, the interlocked closure elements are capable of movement relative to one another for accommodating recovery of the device onto said objects of varying dimensions.

2. A device as claimed in claim 1, wherein the closure portions extend along the edges of the cover.

3. A device as claimed in claim 1, wherein the adjacent pairs of engaged closure elements can move with respect to each other during recovery of the cover by change in their separation or relative orientation.

4. A device as claimed in claim 1, wherein the closure elements are in the form of protuberances arranged so that a protuberance on one closure portion can be nested within a protuberance on the other closure portion.

5. A device as claimed in claim 4, wherein each retaining elements is located about a pair of engaged closure elements and has a recess for receiving the pair of engaged closure elments.

6. A device as claimed in claim 1, wherein the cover is dimensionally heat-recoverable.

7. A device as claimed in claim 1, wherein the closure elements are formed in the cover by a vacuum forming process.

8. A device as claimed in claim 1, which is a wrap-around article.

9. A device as claimed in claim 1, wherein the cover is adapted to be wrapped helically around the elongate object and the closure portions extend along the length of the cover.

10. A dimensionally-recoverable device for enclosing at least part of an elongate object, the device having closure portions that can be retained together by means of a closure arrangement which comprises a closure element located on each closure portion, the closure element on each closure portion being engageable with the closure element on the other closure portion, and a retaining element for retaining the closure elements in engagement, the closure elements and retaining element being arranged so that the retaining element can be twisted about the closure elements to lock the closure elements together.

11. A device as claimed in claim 10, wherein the closure elements are in the form of protuberances arranged so that the protuberance on one closure portion can be nested within the protuberance on the other closure portion.

12. A device as claimed in claim 11, wherein the protuberance that is nested within the other protuberance has an internal hold-out member to retain the shape of the protuberance during recovery of the cover.

13. A device as claimed in claim 12, wherein the internal hold-out member and a recess in the retaining means have corresponding non-circular profiles when viewed from above so that the retaining means can be pushed over the pair of engaged protuberances and can be twisted to a position in which the retaining element and internal hold-out member cooperate to lock the protuberances in engagement.

14. A device as claimed in any one of claims 10 to 13, wherein the retaining element is provided with an indicium to indicate whether or not the retaining element has been twisted.

15. A device as claimed in any one of claims 10 to 13, wherein the closure elements have been formed in the device by a vacuum forming process.

16. An elongate object, at least part of which has been enclosed by recovering thereon a device as claimed in claim 1.

17. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements;

each of the retaining elements in the form of a cap located on each corresponding protuberance of the other closure portion; and whereby the caps will allow the protuberances to be nested and the caps can then be twisted or crimped to grip the nested pair of protuberances, whereby, upon recovery of the device, the corresponding interlocked closure elements are capable of movement relative to one another for accommodating recovery of the device onto objects of varying dimensions.

18. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion;

the closure elements of each closure portion being interlockable with the closure elements of the corresponding closure portion for retaining adjacent pairs of engaged closure elements; and each of the protuberances nested within the other protuberances of each pair of engaged protuberances having an internal hold out member to retain the shape of the protuberance during recovery of the cover;

means for retaining the closure elements in engagement during recovery of the cover, comprising:

a plurality of retaining elements, each of which can be located about a pair of engaged closure elements; and each of the retaining elements having a recess for receiving the pair of engaged closure elements, whereby, upon recovery of the device, the corresponding interlocked closure elements are capable of movement relative to one another for accommodating recovery of the device onto objects of varying dimensions.

19. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and each of the protuberances nested within the other protuberances of each pair of engaged protuberances having an internal hold out member to retain the same of the protuberance during recovery of the cover;

means for retaining the closure elements in engagement during recovery of the cover, comprising:

a plurality of retaining elements, each of which can be located about a pair of engaged closure elements;

each of the retaining elements having a recess for receiving the pair of engaged closure elements;

each of the retaining elements in the form of a cap located on each protuberance of the other closure portion; and whereby the caps will allow the protuberances to nested and the caps can then be twisted or crimped to grip the nested pair of protuberances, whereby, upon recovery of the device, the corresponding interlocked closure elements are capable of movement relative to one another for accommodating recovery of the device onto objects of varying dimensions.

20. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements; and the protuberance nested within the other protuberance of each pair of engaged protuberances having an internal hold out member, the internal hold out member and the recess in the retaining means having corresponding non-circular profiles when viewed from above so that the retaining means can accommodate the pair of engaged protuberances and can be twisted to a position in which the retaining element and the internal hold out member cooperate to lock the protuberances in engagement, whereby, upon recovery of the device, the corresponding interlocked closure elements are capable of movement relative to one another for accommodating recovery of the device onto objects of varying dimensions.

21. A device for enclosing at least part of an elongate object comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements; and the protuberance nested within the other protuberance of each pair of engaged protuberances having an internal hold out member, the internal hold out member and the recess in the retaining means having corresponding non-circular profiles when viewed from above so that the retaining means can accommodate the pair of engaged protuberances and can be twisted to a position in which the retaining element and the intrnal hold out member cooperate to lock the protuberances in engagement, and the internal hold out member and the recess having an elongate profile, whereby, upon recovery of the device, the corresponding interlocked closure elements are capable of movement relative to one another for accommodating recovery of the device onto objects of varying dimensions.

22. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements;

each of the retaining elements in the form of a cap located on each protuberance of the other closure portion;

each retaining element having an indicium to indicate whether or not the retaining element has been twisted; and whereby the caps will allow the protuberances to be nested and the caps can then be twisted or crimped to grip the nested pair of protuberances, whereby, upon recovery of the device, the corresponding interlocked closure elements are capable of movement relative to one another for accommodating recovery of the device onto objects of varying dimensions.

23. A device for enclosing at least part of an elongate object, comprising:

a dimensionally-recoverable cover adapted to be positioned about the object and recovered thereon;

the cover having corresponding closure portions which are non-perforate and which can be retained together in lap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements;

the protuberance nested within the other protuberance of each pair of engaged protuberances having an internal hold out member, the internal hold out member and the recess in the retaining means having corresponding non-circular profiles when viewed from above so that the retaining means can accommodate the pair of engaged protuberances and can be twisted to a position in which the retaining element and the internal hold out member cooperate to lock the protuberances in engagement; and each retaining element having an indicium to indicate whether or not the retaining element has been twisted, whereby, upon recovery of the device, the corresponding interlocked closure elements are capable of movement relative to one another for accommodating recovery of the device onto objects of varying dimensions.

24. A device for enclosing at least part of an elongate object, comprising:

a dimensionally-recoverable cover adapted to be positioned about the object and recovered thereon;

the cover having corresponsind closure portions which are non-perforate and which can be retained together in lkap configuration by means of a mechanical closure arrangement, comprising:

a plurality of closure elements spaced along each closure portion;

the closure elements being in the form of protuberances so that a protuberance on one closure portion can be nested within a protuberance on the other closure portion; and the closure elements of each closure portion being interlockable with the closure elements of the corresponding closure portion for retaining adjacent pairs of engaged closure elements;

means for retaining the closure elements in engagement during recovery of the cover, comprising:

a plurality of retaining elements, each of which can be located about a pair of engaged closure elements;

each of the retaining elements having a recess for receiving the pair of engaged closure elements;

the protuberance nested within the other protuberance of each pair of engaged protuberances having an internal hold out member, the internal hold out member and the recess in the retaining means having corresponding non-circular profiles when viewed from above so that the retaining means can accommodate the pair of engaged protuberances and can be twisted to a position in which the retaining element and the internal hold out member cooperate to lock the protuberances in engagement; and each retaining element having an indicium to indicate whether or not the retaining element has been twisted, whereby, upon recovery of the device, the corresponding interlocked closure elements are capable of movement relative to one another for accommodating recovery of the device onto objects of varying dimensions.

* * * * *

UNITED STATES PATENT AND TRADEMARK OFFICE
CERTIFICATE OF CORRECTION

PATENT NO. : 4,478,252
DATED : October 23, 1984
INVENTOR(S) : Robert H. McLoughlin It is certified that error appears in the above-identified patent and that said Letters Patent is hereby corrected as shown below:

Column 11, Claim 5, line 38, "elments." should read --elements---.
Column 13, Claim 19, line 41, "same" should read --shape--.
　　　　　　　　line 53 after "to" insert --be--;
Column 15, Claim 21, line 1, "intrnal" should read --internal--.
Column 16, Claim 24, line 28, "corresponsind" should read --corresponding--.
Column 16, Claim 24, line 30, "lkap" should read --lap--.

Signed and Sealed this

Seventeenth Day of September 1985

[SEAL]

Attest:

Attesting Officer

DONALD J. QUIGG

*Commissioner of Patents and Trademarks—Designate*